Oct. 24, 1939.                    E. H. LOCKWOOD                    2,177,281
                    HEATING SYSTEM AND SWITCH THEREFOR
                    Filed Dec. 9, 1936          3 Sheets-Sheet 1

WITNESSES:
Michael Stark
N. G. Hepler

INVENTOR
Edwin H. Lockwood.
BY
W. R. Coley
ATTORNEY

Oct. 24, 1939.  E. H. LOCKWOOD  2,177,281

HEATING SYSTEM AND SWITCH THEREFOR

Filed Dec. 9, 1936  3 Sheets-Sheet 2

WITNESSES:
Michael Stark
H.E. Hepler

INVENTOR
Edwin H. Lockwood.
BY
W.R. Coley
ATTORNEY

Oct. 24, 1939.     E. H. LOCKWOOD     2,177,281
HEATING SYSTEM AND SWITCH THEREFOR
Filed Dec. 9, 1936     3 Sheets—Sheet 3

WITNESSES:
Michael Stark
H. G. Hepler

INVENTOR
Edwin H. Lockwood.
BY
W. R. Coley
ATTORNEY

Patented Oct. 24, 1939

2,177,281

UNITED STATES PATENT OFFICE 2,177,281

HEATING SYSTEM AND SWITCH THEREFOR

Edwin H. Lockwood, Mansfield, Ohio, assignor to Westinghouse Electric & Manufacturing Company, East Pittsburgh, Pa., a corporation of Pennsylvania Application December 9, 1936, Serial No. 114,963

18 Claims. (Cl. 219—20)

My invention relates to range heating systems and switches therefor, and more particularly to a rotatable multiplate switch for changing connections between a three-wire supply circuit and a three-unit resistor or the like.

It has been found that for cooking operations upon the surface units of electric ranges, the change of rate at which the heat is supplied between the various switch positions is inconveniently large. This has given rise to a disadvantage of the electric range over the gas range which may have the heat supply adjusted to any desirable value at the will of the operator. It is, therefore, an object of my invention to provide means whereby the increment between the changes of rate at which heat is supplied to the surface units of electric ranges may be reduced to a minimum value.

It has also been found upon ranges known to the art that for cooking operations in which food is to simmer, the rate at which the heat is supplied, even at the lowest adjustment thereof, is inconveniently large. This gives an additional disadvantage of the electric range over the gas range which may have the simmering heat adjusted to any necessary low value. It is, therefore, a further object of my invention to provide means whereby the heat supplied at the simmering position may be adjusted to a conveniently low value.

It is a further object of my invention to provide a rugged rotatable switch which can be inexpensively produced and will be sturdy and not easily injured by frequent operations.

It is a further object of my invention to provide a switch whereby a three-unit resistor may be connected, in parallel, in series, in seriesparallel, or singly to a three-wire supply circuit.

Other objects of my invention will either be pointed out specifically in the course of the following description, or will be apparent from such description taken in conjunction with the accompanying drawings, in which.

Figure 1:
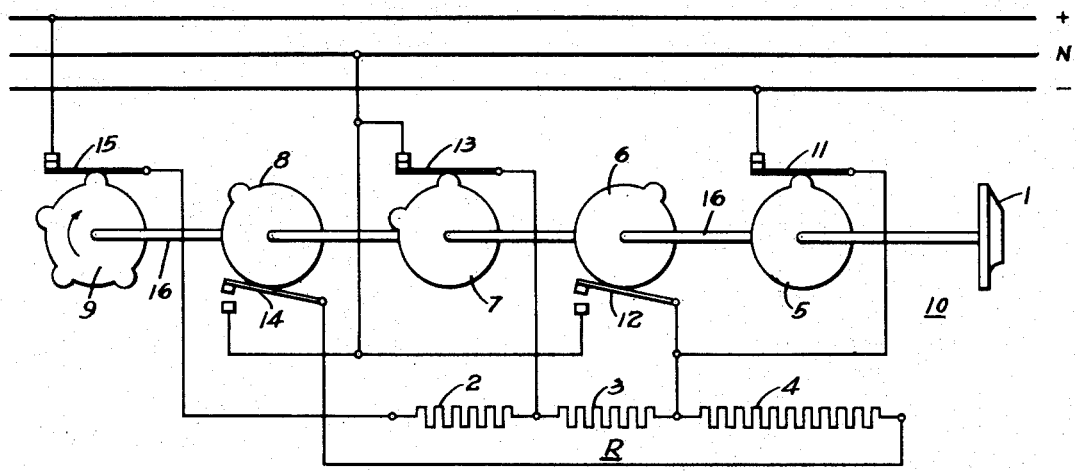
Figure 1 is a diagrammatic view of a device embodying my invention connected to a three-wire power supply and through changeable connections to a three-unit resistor.
Figure 6:
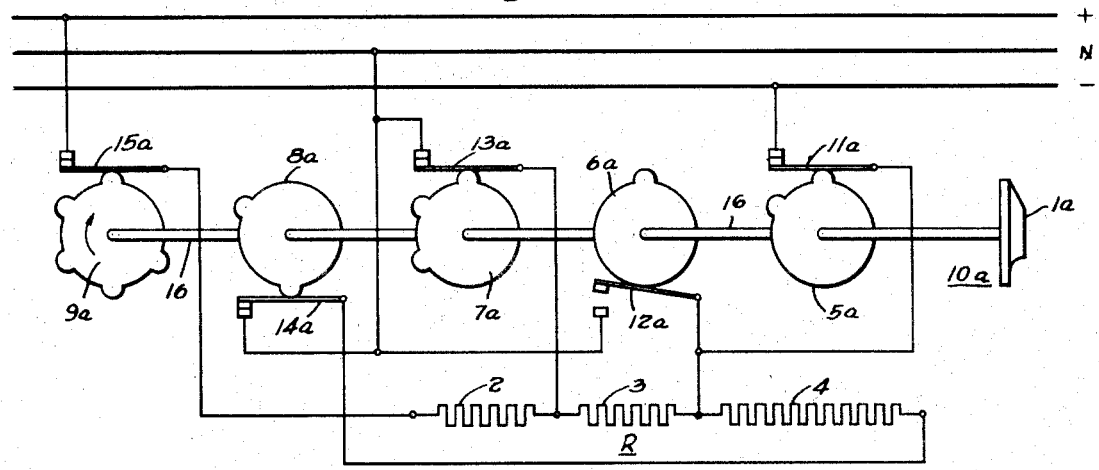
Fig. 6 is a view similar to Fig. 1 of another device embodying my invention.
Figure 12:
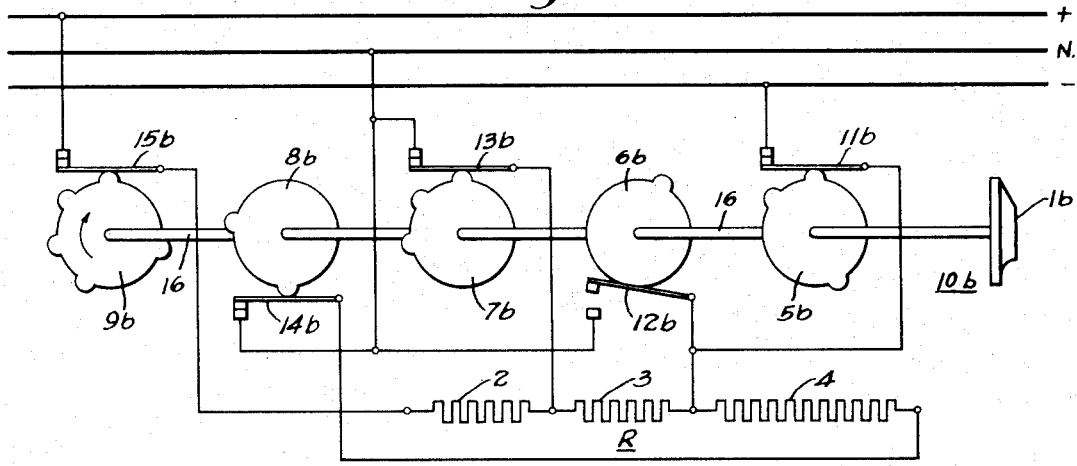
Fig. 12 is a view similar to Fig. 1 and Fig. 6 of another device embodying my invention.

Figs. 1, 6 and 12 of the drawings show my preferred form of switch comprising, in the case of Fig. 1, a rotatably movable switch 10 having an operating knob 1 and a plurality of cams 5, 6, 7, 8 and 9. The switch is connected to the illustrated three-wire supply circuit having a positive wire designated as +, a negative wire designated as — and a neutral wire designated as N. Connected to the opposite side of the movable switch is a three-unit resistor R or the like. The cams 5, 6, 7, 8 and 9 have protuberances which operate finger switches or switch blades which connect the various sections of the three-unit resistor to the power supply. The cams are removably placed upon a shaft 16 which is rotated by knob 1.

Figure 2:
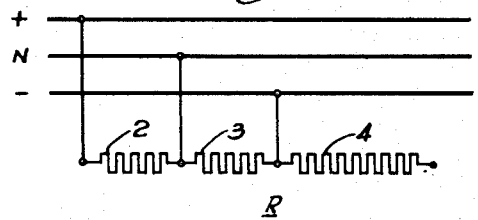
Fig. 2 is a circuit diagram with the switch in the position as illustrated in Fig. 1.

With the rotatable switch in the position as illustrated in Fig. 1, the switch handle 1 has caused switches 11, 13 and 15 to be closed, thus connecting coils 2 and 3 in series between the positive and negative mains + and —, the neutral connection being established from wire N by switch 13 to the junction point between sections 2 and 3, as illustrated in Fig. 2.

Figure 3:
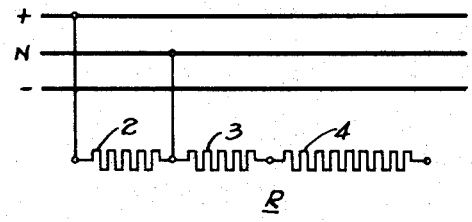
Figs. 3, 4 and 5 show circuit diagrams of the switch illustrated in Fig. 1, in its various other positions.

By rotating handle 1 one-fifth of a turn in a clockwise direction, switches 15 and 13 are closed to connect coil 2 across positive wire + and neutral wire N, thus providing connections as illustrated in Fig. 3.

Figure 4:
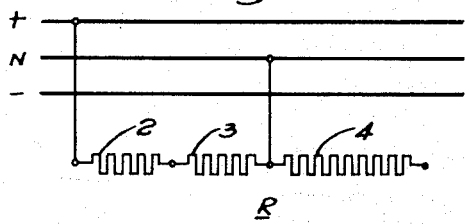
Figure 5:
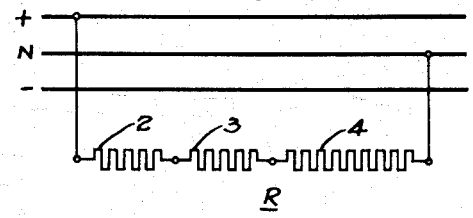

By rotating the knob 1 an additional fifth turn, switches 15 and 12 are closed, connecting the three-element resistor to the power supply as illustrated by the wiring diagram of Fig. 4, the coils 2 and 3 being in series across the positive and neutral wires through switches 15 and 12.

By rotating the knob 1 and operatively associated cams 5 to 9, inclusive, an additional one-fifth turn, the three-element resistors 2, 3 and 4 are connected in series through switch 15 and switch 14 between the positive and neutral wires.

By rotating the knob 1 and operatively associated cams 5 to 9, inclusive, an additional one-fifth turn, all the switches will be in an open position which disconnects the three-element resistor from the power supply.

Figure 7:
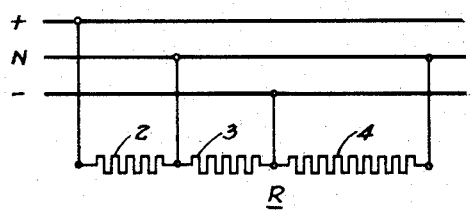
Fig. 7 is a circuit digram with the switch in the position as illustrated in Fig. 6.

The switch 10a, as illustrated in Fig. 6, has cams of such a nature that the switch is to be operated in six positions. The position shown in Fig. 6 connects the three-unit resistor to the power supply as illustrated in the wiring diagram of Fig. 7, switches 11a, 13a, 14a and 15a being closed whereby units 2 and 3 are connected in series between the positive and negative lines; the neutral wire being connected through switch 14a to the free end of resistor coil 4 and through switch 13a to the junction point of resistor coils 2 and 3, thus connecting units 3 and 4 in parallel across the neutral and negative wires.

Figure 8:
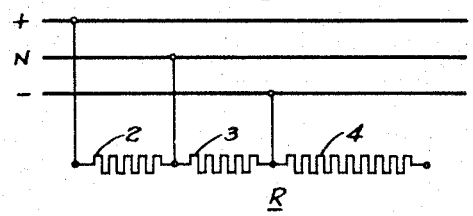
Figs. 8, 9, 10 and 11 show circuit diagrams of the switch illustrated in Fig. 6, in its various other positions.

By rotating knob 1a one-sixth of a turn in a clockwise direction, switches 15a and 11a are closed, connecting units 2 and 3 in series across the positive and negative wires, switch 13a being closed connecting the neutral wire to the junction point of resistors 2 and 3, as illustrated in Fig. 8.

Figure 9:
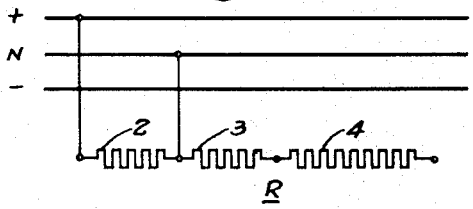

By rotating knob 1a and operatively associated cams 5a to 9a, inclusive, an additional one-sixth turn, switches 15a and 13a are closed whereby unit 2 is connected across the positive and neutral wires, as shown in Fig. 9.

Figure 10:
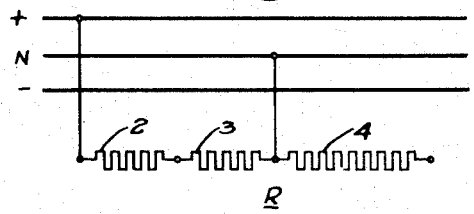

By rotating the knob 1a and operatively associated cams 5a to 9a, inclusive, an additional one-sixth turn, switches 15a and 12a are closed, connecting units 2 and 3 in series across the positive and neutral wires as illustrated in Fig. 10.

Figure 11:
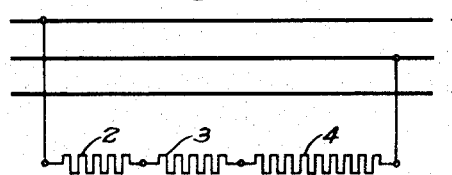

By rotating the knob 1a and operatively associated cams 5a to 9a, inclusive, an additional one-sixth turn, switches 15a and 14a are closed, connecting units 2, 3 and 4 in series across the positive and neutral wires as shown in Fig. 11.

By rotating knob 1a and operatively associated cams 5a to 9a, inclusive, an additional one-sixth turn, the switches 11a to 15a, inclusive, will all be in an open position, thereby disconnecting the three-unit resistor 2—3—4 from the power supply.

Figure 13:
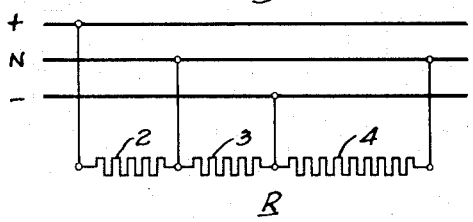
Fig. 13 is a circuit diagram with the switch in the position as illustrated in Fig. 12; and, Figs. 14, 15, 16, 17 and 18 show circuit diagrams of the switch illustrated in Fig. 12, in its various other positions.

The switch 10b, as illustrated in Fig. 12, has cams designed for seven positions. With the switch in the position as shown in Fig. 12, the three-unit resistor 2—3—4 is connected to the power supply as shown in the wiring diagram of Fig. 13. Switches 15b and 11b are closed, connecting units 2 and 3 in series across the positive and negative wires. Switch 13b is closed, connecting the junction-point of units 2 and 3 to the neutral wire. Switch 14b is closed and likewise connects the neutral wire to the free end of unit 4. It is therefore, obvious that units 3 and 4 are in parallel across the neutral and negative wires.

Figure 14:
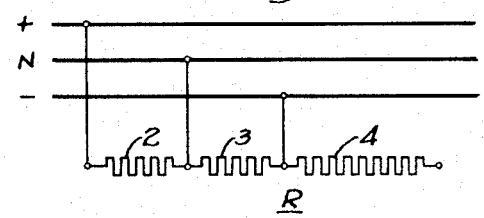

By rotating knob 1b and operatively associated cams 5b to 9b, inclusive, one-seventh of a turn forward, the three-unit resistor is connected to the power supply as shown in Fig. 14. Switches 15b and 12b are closed, connecting units 2 and 3 in series across the positive and negative wires. Switch 13b is closed, connecting the junction-point of units 2 and 3 to the neutral wire.

Figure 15:
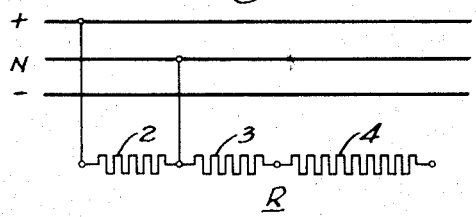

By rotating knob 1b and operatively associated cams 5b to 9b, inclusive, an additional one-seventh of a turn, the three-unit resistor is connected to the power supply as shown in Fig. 15. Switches 15b and 13b are then closed, connecting unit 2 across the positive and neutral wires.

Figure 16:
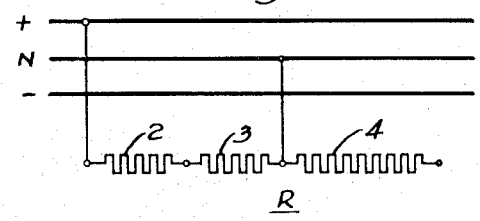

By rotating the knob 1b and operatively associated cams 5b to 9b, inclusive, an additional one-seventh of a turn, the three-element resistor 2—3—4 is connected with the power supply as shown in Fig. 16. Switches 15b and 12b are then closed, connecting units 2 and 3 in series across the positive and neutral wires.

Figure 17:
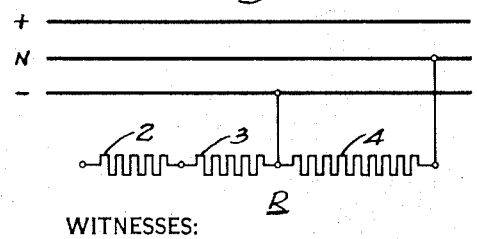

By rotating the knob 1b one-seventh of a turn in a clockwise direction to its fifth position, the operatively associated cams 5b to 9b, inclusive, close switches 11b and 14b which connect unit 4 across the neutral and negative wires as shown in Fig. 17.

Figure 18:
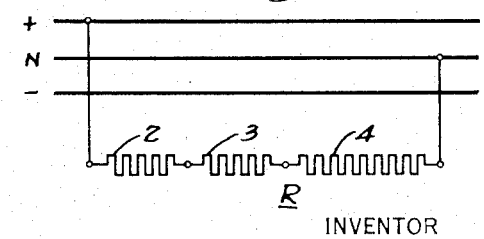

By rotating the knob 1b and operatively associated cams 5b to 9b, inclusive, to their sixth position, switches 14b and 15b are closed, thus connecting the three-unit resistor 2, 3 and 4 in series across the positive and neutral wires as shown in Fig. 18.

By rotating the knob 1b and operatively associated cams 5b to 9b, inclusive, an additional one-seventh of a turn in a clockwise direction, the rotatable multiple switch 10 is in an "off" position, all of the switches 11b to 15b, inclusive, being in an open position, thereby disconnecting the three-unit resistor 2—3—4 from the power supply.

The switches as hereabove described may readily be adapted for use with a two-wire supply source merely by connecting the two outside terminals of switch 10, 10a or 10b, as the case may be, together and to one supply wire. The operations of any one of the switches, so connected, and the connections between such switch and the resistor or the like, will remain the same as when the switch was connected to a three-wire supply source. Accordingly, a switch utilizing my invention may be used interchangeably, at will, between either a three-wire or a two-wire supply source.

I wish it to be understood that I desire in no way to limit my device to the cam and finger type switches as illustrated in Figs. 1, 6 and 12, but wish to state that any multiple switch capable of performing the before-mentioned functions of said cams and switches may be used to produce the same results. Likewise, various other modifications may be made in the device embodying my invention without departing from the spirit and scope thereof and I desire that only such limitations shall be placed thereon as are imposed by the prior art and the appended claims.

I claim as my invention:

1. In a switch for establishing selected connections of a three-unit resistor or the like, having four terminals attached thereto including two intermediate terminals, with three line wires, the combination with a plurality of contact makers, of means on one of said makers for connecting one of said line wires with one end terminal of said resistor, means on a second of said makers for connecting a second of said line wires with an intermediate terminal of the resistor, and means on others of said makers for connecting the third line wire with at least one of the terminals of the resistor on each working position of the switch.

2. In a switch for establishing selected connections of a three-unit resistor or the like, having four terminals attached thereto including two intermediate terminals, with three line wires, the combination with a plurality of contact makers, of means on one of said makers for connecting one of said line wires with one end terminal of said resistor, means on a second of said makers for connecting a second of said line wires with one intermediate terminal of the resistor, means on a third maker for connecting the third line wire with the second end terminal of said resistor, and means on others of said makers for connecting the third line wire with either the second or first intermediate terminal of said resistor.

3. In a switch for establishing selected connections of a three-unit resistor or the like, having four terminals attached thereto including two intermediate terminals, with three line wires, the combination with a plurality of contact makers, of means on one of said makers for connecting one of said line wires with one end terminal of said resistor, means on a second of said makers for connecting a second of said line wires with one intermediate terminal of the resistor, means on a third of said makers for connecting the third line wire with the other end terminal of said resistor, means on a fourth of said makers for connecting the third line wire with the second intermediate terminal of said resistor, and means on a fifth maker for connecting the third line wire to the first intermediate terminal of said resistor.

4. In a switch for establishing selected connections of a three-unit resistor or the like, having four terminals attached thereto including two intermediate terminals, with three line wires, the combination with a plurality of contact makers, of means on one of said makers for connecting one of said line wires with one end terminal of said resistor, means on a second maker for connecting a second of said line wires with one intermediate terminal of the resistor, and means on a third and fourth of said makers for connecting the third line wire to both the second intermediate terminal and the second end terminal of said resistor.

5. In a switch for establishing selected connections of a three-unit resistor or the like, having four terminals attached thereto including two intermediate terminals, with three line wires, the combination with a plurality of contact makers, of means on one of said makers for connecting one of said line wires with one end terminal of said resistor, means on a second maker for connecting a second of said line wires with one intermediate terminal of the resistor, and means on a third and fourth of said makers for connecting the third line wire with either the second intermediate or the second end terminal or with both the second intermediate and the second end terminal of said resistor.

6. In a switch for establishing selected connections of a three-unit resistor or the like, having four terminals attached thereto including two intermediate terminals, with two outside line wires and a neutral wire, the combination with a plurality of contact makers, of means on one of the makers for connecting one of said outside line wires with one end terminal of said resistor, means on a second maker for connecting the second outside line wire with one intermediate terminal of the resistor, and means on the third, fourth and fifth of said makers for connecting the neutral wire with at least one of the terminals of the resistor on each working position of the switch.

7. In a switch for establishing selected connections of a three-unit resistor or the like, having four terminals attached thereto including two intermediate terminals, with two outside line wires and a neutral wire, the combination with a plurality of contact makers, of means on one of the makers for connecting one of said outside line wires with one end terminal of said resistor, means on a second maker for connecting the second outside line wire with one intermediate terminal of the resistor, means on a third maker for connecting the neutral wire with the second end terminal of said resistor, and means on others of said makers for connecting the neutral wire with either the second or first intermediate terminal of said resistor.

8. In a switch for establishing selected connections of a three-unit resistor or the like, having four terminals attached thereto including two intermediate terminals, with two outside line wires and a neutral wire, the combination with a plurality of contact makers, of means on one of the makers for connecting one of said outside line wires with one end terminal of said resistor, means on a second maker for connecting the second outside line wire with one intermediate terminal of the resistor, means on a third maker for connecting the neutral wire with the second end terminal of said resistor, means on a fourth of the other makers for connecting the neutral wire with the second intermediate terminal of said resistor, and means on a fifth maker for connecting the neutral wire to the first intermediate terminal of said resistor.

9. In a switch for establishing selected connections of a three-unit resistor or the like, having four terminals attached thereto including two intermediate terminals, with two outside line wires and a neutral wire, the combination with a plurality of contact makers, of means on one of the makers for connecting one of said outside line wires with one end terminal of said resistor, means on a second maker for connecting the second line wire with one intermediate terminal of the resistor, and means on the third and fourth makers for connecting the neutral wire with both the second intermediate terminal and the second end terminal of said resistor.

10. In a switch for establishing selected connections of a three-unit resistor or the like, having four terminals attached thereto including two intermediate terminals, with two outside line wires and a neutral wire, the combination with a plurality of contact makers, of means on one of the makers for connecting one of said outside line wires with one end terminal of said resistor, means on a second maker for connecting the second outside line wire with one intermediate terminal of the resistor, and means on a third and fourth maker for connecting the neutral wire with either the second intermediate or second end terminal or with both the second intermediate and second end terminal of said resistor.

11. In combination, three resistance elements and a switching means having three current supply terminals and adapted to connect two of said elements in series across two different pairs of said terminals in two of its positions, to connect one of said elements across a pair of said terminals in another position, and to connect all three of said elements in series across one of said pairs in another position.

12. In combination, three resistance elements and a single rotary switch having three current supply terminals and adapted to connect two of said elements in series across two different pairs of said terminals in two of its positions, to connect one of said elements across a pair of said terminals in another position, and to connect all three of said elements in series across one of said pairs in another position.

13. In combination, three resistance elements and a switching means having three current supply terminals and adapted, to connect two of said elements in series across two different pairs of said terminals in two of its positions, to connect one of said elements across a pair of said terminals in another position, to connect all three of said elements in series across one of said pairs in another position, and to connect two of said elements in series across a pair of said terminals, a point intermediate said two elements being connected to the third terminal, with the third element in parallel with one of the said series elements in another position.

14. In combination, three resistance elements and a single rotary switch having three current supply terminals and adapted, to connect two of said elements in series across a different pair of said terminals in two of its positions, to connect one of said elements across a pair of said terminals in another position, to connect another of said elements across a second pair of said terminals in another position, to connect all three of said elements in series across one of said pairs in another position, and to connect two of said elements in series across a pair of said terminals, a point intermediate said two elements being connected to the third terminal with the third element in parallel with one of the said series elements in another position.

15. In combinaiton, three resistance elements and a single rotary switch having three current supply terminals, one of them being a common terminal and the others being respectively adapted to have a high and an intermediate voltage applied thereto, said switch being adapted to selectively connect two of said elements in series across said common terminal and the high voltage terminal in one of its positions, to connect one of said elements across said common terminal and the intermediate voltage terminal in another position, and to connect all three of said elements in series across said common terminal and the intermediate voltage terminal in another position.

16. In combination, three resistance elements and a single rotary switch having three current supply terminals, one of them being a common terminal and the others being respectively adapted to have a high and an intermediate voltage applied thereto, said switch being adapted to selectively connect two of said elements in series across said common terminal and each of the others in two of its positions, to connect one of said elements across said common terminal and the intermediate voltage terminal in another position, and to connect all three of said elements in series across said common terminal and the intermediate voltage terminal in another position.

17. In combination, three resistance elements and a single rotary switch having three current supply terminals, one of them being a common terminal and the others being respectively adapted to have a high and an intermediate voltage applied thereto, said switch being adapted to selectively connect two of said elements in series across said common terminal and each of the others in two of its positions, to connect one of said elements across said common terminal and the intermediate voltage terminal in another position, to connect all three of said elements in series across said common terminal and the intermediate voltage terminal in another position, and to connect two of said elements in series across said common terminal and the high voltage terminal, a point between said two elements being connected to the intermediate voltage terminal, with the third element in parallel with one of said series elements in another position.

18. In combination, three resistance elements and switching means having three current supply terminals, two of said terminals corresponding to a predetermined voltage and the third terminal corresponding to a voltage less than said predetermined voltage, said switching means adapted to connect two of said elements in series across said two terminals and across said third terminal and one of the other two in two of its positions, to connect one of said elements across said third terminal and one of the other two terminals in another position, and to connect all three of said elements in series across said third terminal and one of the other two terminals in another position.

EDWIN H. LOCKWOOD.